United States Patent Office 3,597,483
Patented Aug. 3, 1971

3,597,483
PRODUCTION OF 1,2-DIAMINES
Erich Haarer and Hubert Corr, Ludwigshafen (Rhine), and Siegfried Winderl, Heidelberg, Germany, assignors to Badische Anilin- & Soda-Fabrik Aktiengesellschaft, Ludwigshafen (Rhine), Germany
No Drawing. Filed Apr. 8, 1968, Ser. No. 719,686
Claims priority, application Germany, Apr. 13, 1967,
P 15 93 775.4
Int. Cl. C07c *85/02*
U.S. Cl. 260—563          13 Claims

ABSTRACT OF THE DISCLOSURE

An improved process for the production of 1,2-diamines by reaction of 1,2-epoxides with ammonia, primary amines or secondary amines in the presence of water, hydrogen and hydrogenation catalysts at elevated temperature and superatmospheric pressure wherein the improvement comprises using a supported hydrogenation catalyst having a large internal surface area. The products are suitable as complex-forming substances for heavy metal ions.

---

This invention relates to a process for the production of 1,2-diamines by reaction of 1,2-epoxides with ammonia, primary amines or secondary amines.

It is known from U.S. Pat. No. 3,270,059 that 1,2-diamines are obtained when an alkanolamine or alkylene oxide is reacted with ammonia in the presence of water, hydrogen and a catalyst which contains copper, silver, manganese, iron, nickel or cobalt and which has been sintered, at a pressure of more than 10 atmospheres and at a temperature of 150° to 300° C. The process has the disadvantage that when alkanolamines are used as starting materials they first have to be prepared and this involves additional expenditure. When alkylene oxides are used as starting materials however only part of the alkylene oxide is converted into the 1,2-diamine.

It is an object of this invention to provide an improved process for the production of 1,2-diamines in which 1,2-diamines are obtained in a single stage starting from 1,2-epoxides. A further object of the invention is to provide a process in which the reaction proceeds almost quantitatively.

In accordance with this invention, these and other objects and advantages are achieved in an improved process for the production of 1,2-diamines by reaction of 1,2-epoxides with ammonia, primary amines or secondary amines in the presence of water, hydrogen and hydrogenation catalysts at elevated temperature and superatmospheric pressure, wherein the improvement comprises using hydrogenation catalysts combined with a carrier which have a large internal surface area.

Preferred 1,2-epoxides are aliphatic 1,2-epoxides having two to twelve, particularly two to eight, carbon atoms, cycloaliphatic 1,2-epoxides having five to twelve, particularly six to twelve carbon atoms, or araliphatic 1,2-epoxides having two to twelve carbon atoms, particularly two to eight carbon atoms and one epoxy group in the molecule. Apart from the epoxy group, the preferred 1,2-epoxides have hydrocarbon structure. Preferred cycloaliphatic 1,2-epoxides are derived from six-membered to twelve-membered cycloalkanes. Examples of suitable starting materials are: ethylene oxide, propylene oxide, isobutylene oxide, octene oxide-(1), dodecene oxide-(1), cyclohexene oxide, cyclooctene oxide, cyclododecene oxide and styrene oxide. Ethylene oxide and propylene oxide are preferred as starting materials because of their easy technical accessibility.

Preferred primary or secondary amines have as substituents alkyl radicals having one to six, particularly one to four, carbon atoms or a cyclohexyl radical. Apart from the amino groups, the preferred amines have hydrocarbon structure. Examples of suitable starting amines are: methylamine, butylamine, n-hexylamine, dimethylamine, diethylamine, n-butylmethylamine or cyclohexylamine. Other suitable amines are five-membered to six-membered heterocyclic amines in which the secondary amino group is part of the heterocyclic ring, such as piperidine, pyrrolidine, piperazine and morpholine.

It is advantageous to use 5 to 40 moles of ammonia, primary amine or secondary amine per mole of 1,2-epoxide. Particularly good results are obtained by using 10 to 30 moles of ammonia, primary amine or secondary amine per mole of 1,2-epoxide. The reaction is carried out in the presence of water. It has proved to be advantageous to use 1 to 20% by weight of water with reference to the 1,2-epoxide. It is partciularly advantageous to use water in an amount of 5 to 10% by weight.

The reaction is advantageously carried out at a temperature of from 150° to 240° C. It is preferable to use a temperature of from 160° to 200° C. In general a pressure of from 100 to 300 atmospheres is used. Particularly good results are achieved at pressures of 200 to 280 atmospheres. Pressure in excess of the vapor pressure of the starting materials at the temperature used is achieved by forcing in hydrogen.

Preferred supported catalysts contain the metals: cobalt, nickel, platinum, palladium or ruthenium, particularly cobalt or nickel. The catalysts advantageously contain 50 to 100% by weight, particularly 80 to 100% by weight of the said metals with reference to the metal content of the catalysts. They may also contain activators, such as copper, chromium or manganese, in amounts of 0.1 to 20% by weight, particularly 0.2 to 10% by weight, with reference to the metal content of the catalyst. The catalysts are supported on carriers such as aluminum oxide, silicic acid, silica gel, silicates, titanium dioxide, pumice, coke, carbon, clay or fuller's earth. The finished catalyst contains advantageously 3 to 80% by weight of the said metals. An essential feature of the invention is that the finished catalyst should have a large internal surface area. Preferred catalysts have an inner surface area of 0.1 to 1200 m.²/g., particularly 1 to 500 m.²/g. A further characteristic feature of the finished catalyst is its mean pore radius. It has proved to be favorable for the mean pore radius to be 20 to 10,000 A, particularly 40 to 7000 A. It has furthermore been found that it is advantageous for the catalyst to have a content of an inorganic pyroacid or polyacid, for example of 0.1 to 15% by weight, particularly 1 to 10% by weight, with reference to the finished catalyst. Examples of suitable acids are polyphosphoric acids, tetraboric acid and pyrosulfuric acid or salts of the same. The pyroacids or polyacids are present in the finished catalysts as free acids or as salts with at least one of the metals specified above.

The process according to the invention may be carried out for example by arranging the said catalyst stationarily in a high pressure tube and metering 1,2-epoxide, ammonia, primary amine or secondary amine, water and hydrogen in the ratio described into the top of the high pressure tube while maintaining the said temperature and pressure. The desired diamines may be obtained in pure form from the reaction product by fractional distillation.

The 1,2-diamines prepared by the process according to this invention are suitable for forming complex compounds with heavy metal ions.

The invention is further illustrated by the following example in which the parts specified are parts by weight unless otherwise state. Parts by weight bear the same relation to parts by volume as the kilogram to the liter.

EXAMPLE

A vertical high pressure tube having a capacity of 500 parts by weight is filled with a catalyst applied to alumina. This supported catalyst contains 19% by weight of cobalt and 1.0% by weight of chromium. Moreover it contains 0.5% by weight of phosphoric acid with reference to the total of catalyst and carrier, calculated as phosphorus pentoxide. The supported catalyst used has an internal surface area of 140 m.$^2$/g. 50 parts per hour of a 90% aqueous propylene oxide and 500 parts by volume of liquid ammonia are metered into the top of the high pressure tube while a temperature of 180° C. is maintained. A pressure of 280 atmospheres is maintained by forcing in hydrogen at the same time. Ammonia and water are distilled off from the reaction product. 54 parts per hour of a mixture containing 5.4% by weight of isopropanolamine, 1.2% by weight of diisopropanolamine, 60.7% by weight of propylenediamine-(1,2), 23.9% by weight of 2,5-dimethylpiperazine and 5.7% by weight of non-distillable residue is obtained.

We claim:

1. In a process for the production of 1,2-diamines by reaction of aliphatic 1,2-epoxides having two to twelve carbon atoms, cycloaliphatic 1,2-epoxides having five to twelve carbon atoms or araliphatic 1,2-epoxides having eight carbon atoms, all of said epoxides having a hydrocarbon structure apart from the epoxy group, with ammonia, a primary amine or a secondary amine which contains as a substituent an alkyl radical having one to six carbon atoms, in the molar ratio of from 1:5 to 1:40 in the presence of 1 to 20% by weight of water (with reference to the 1,2-epoxide) and in the presence of hydrogen and a hydrogenation catalyst at a temperature of from 150° to 240° C. and at a pressure of from 100 to 300 atmospheres, the improvement which comprises using a supported catalyst which has an internal surface area of 0.1 to 1200 m.$^2$/g. and which contains 50 to 100% by weight of cobalt or nickel with reference to the total metal content of the catalyst.

2. A process as claimed in claim 1 wherein an aliphatic 1,2-epoxide having two to eight carbon atoms is used.

3. A process as claimed in claim 1 wherein a cycloaliphatic 1,2-epoxide having six to twelve carbon atoms is used which is derived from a six-membered to twelve-membered cycloalkane.

4. A process as claimed in claim 1 wherein ethylene oxide is used as starting material.

5. A process as claimed in claim 1 wherein propylene oxide is used as starting material.

6. A process as claimed in claim 1 wherein a primary or secondary amine is used which has an alkyl radical having one to four carbon atoms.

7. A process as claimed in claim 1 wherein 10 to 30 moles of ammonia, primary amine or secondary amine is used for each 1 mole of 1,2-epoxide.

8. A process as claimed in claim 1 wherein the reaction is carried out in the presence of 5 to 10% by weight of water with reference to the 1,2-epoxide.

9. A process as claimed in claim 1 wherein a temperature of from 160° to 200° C. is used.

10. A process as claimed in claim 1 carried out at a pressure of from 200 to 280 atmospheres.

11. A process as claimed in claim 1 wherein a supported catalyst is used which has an internal surface area of from 1 to 500 m.$^2$/g.

12. A process as claimed in claim 1 wherein said catalyst has a mean pore radius of about 20 to 10,000 A.

13. A process as claimed in claim 1 wherein said supported catalyst consists essentially of 80 to 100% by weight of cobalt or nickel and up to 20% by weight of copper, chromium or manganese as an activator, the percentages by weight being with reference to the total metal content of the catalyst, and also 0.1 to 15% by weight with reference to the finished catalyst including the supporting carrier of an inorganic pyroacid or polyacid.

References Cited

UNITED STATES PATENTS 3,068,290   12/1962   Lichtenberger et al. 260—585(B)
3,270,059   8/1966    Winderl et al. ----- 260—583(I)

CHARLES B. PARKER, Primary Examiner

R. L. RAYMOND, Assistant Examiner

U.S. Cl. X.R.

260—247, 268, 293, 326.8, 570.5, 583, 585